United States Patent [19]

Traxler et al.

[11] Patent Number: 5,577,418
[45] Date of Patent: Nov. 26, 1996

[54] TRANSMISSION MANUAL SHIFT LEVER ASSEMBLY

[75] Inventors: Mark T. Traxler; Richard A. White, both of Franklin; John K. Quinlan, Brentwood, all of Tenn.; John J. Berndtson, St. Clair Shores, Mich.

[73] Assignee: Saturn Corporation, Troy, Mich.

[21] Appl. No.: 416,557

[22] Filed: Apr. 4, 1995

[51] Int. Cl.⁶ .................................................... G05G 5/06
[52] U.S. Cl. .................................. 74/528; 74/543; 74/557
[58] Field of Search ............................ 74/538, 528, 543, 74/557, 475; 403/229

[56] References Cited

U.S. PATENT DOCUMENTS

| | | | |
|---|---|---|---|
| 632,668 | 9/1899 | Alm | 403/229 |
| 1,974,973 | 9/1934 | Paul | 74/538 |
| 4,774,850 | 10/1988 | Shovlin | 74/538 |
| 5,005,438 | 4/1991 | Marshall | 74/538 |
| 5,062,314 | 11/1991 | Maier et al. | 74/538 |
| 5,247,849 | 9/1993 | Sato | 74/538 |

*Primary Examiner*—Charles A. Marmor
*Assistant Examiner*—Chong H. Kim
*Attorney, Agent, or Firm*—Donald F. Scherer

[57] ABSTRACT

A manual shift lever for an automatic transmission has a park position and a plurality of drive positions. The shift lever is detented into each position and has both a brake/transmission shift interlock (BTSI) and an ignition interlock which independently inhibit shifting from the park position prior to predetermined operating inputs, such as manipulating the ignition key and/or the brake pedal. A bell crank connected with the interlocks provides the inhibiting structure. To limit the operator input force on the bell crank, a lost motion structure is provided between an operator button on the shift lever handle and an actuator rod and pin which engage the bell crank.

4 Claims, 1 Drawing Sheet

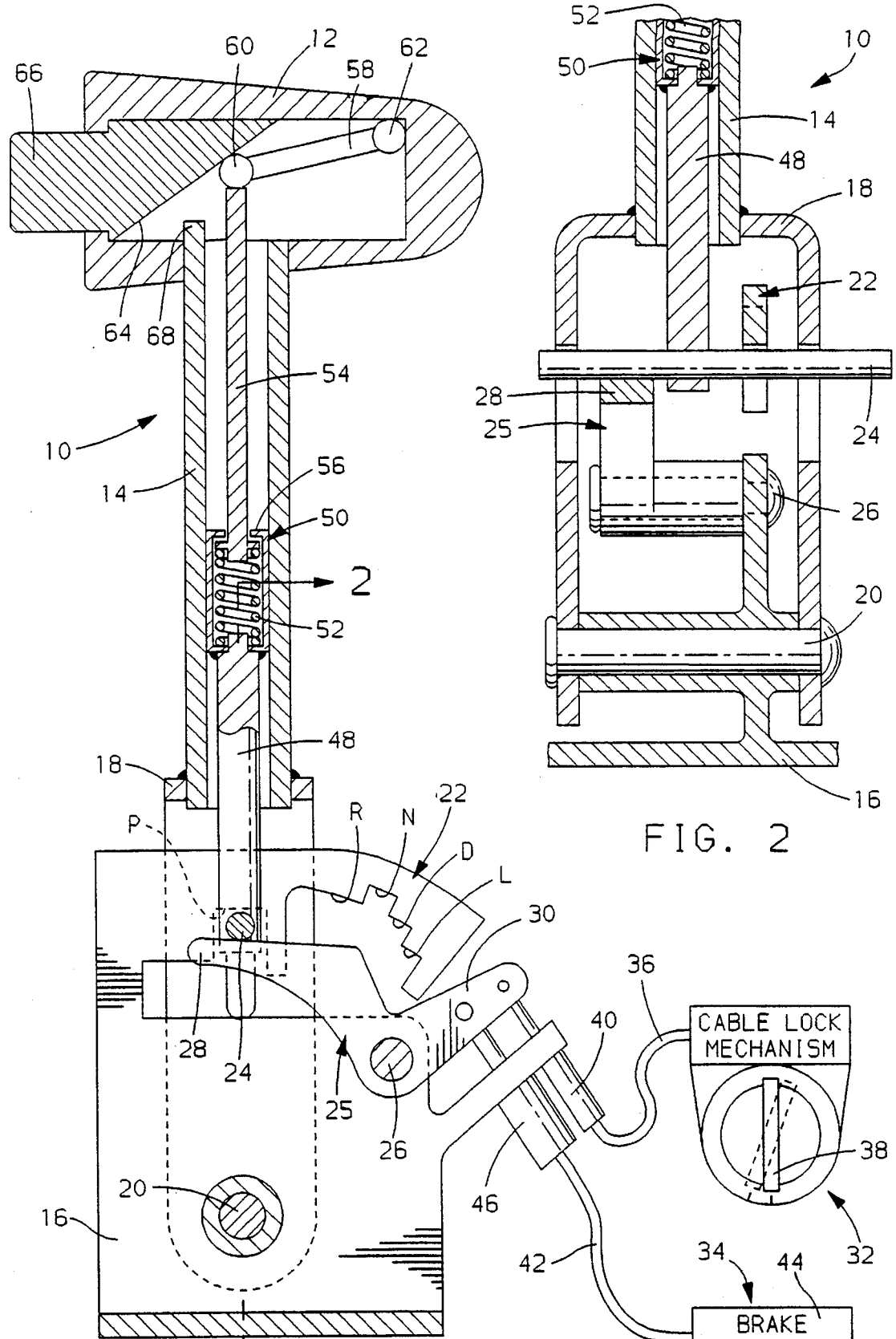

TRANSMISSION MANUAL SHIFT LEVER ASSEMBLY

TECHNICAL FIELD

This invention relates to manual transmission shift lever assemblies.

BACKGROUND OF THE INVENTION

Manual shift levers are provided with automatic shifting transmissions to permit the operator to have control over selection of the transmission operating condition. For a number of years, these lever assemblies have been incorporated in systems adapted to include an ignition interlock which prevents removal of the shift lever from the park position prior to the operator manipulating the ignition from the lock position, and also preventing return of the ignition to the lock position prior to the transmission being returned to the park position. More recently, these systems have also included brake/transmission shift interlocks (BTSI) which prevent removal of the lever from the park position prior to manipulation of the brake pedal.

The shift lever is detentably retained in the various operating conditions by spring loaded engagement of the detent pawl in selected slots or grooves on the detent plate or gate plate. The detent pawl is generally controlled by an operator actuator, such as a button and rod, to inhibit movement of the lever without prior depression of the button.

Many of the ignition interlocks and BTSI's are designed to operate on the detent pawl and must, therefore, have sufficient system stiffness to withstand the operator input forces exerted thereon prior to the required operator manipulations. This is particularly true of the ignition interlock on floor mounted transmissions which is present primarily to prevent unauthorized movement of the vehicle.

SUMMARY OF THE INVENTION

It is an object of the present invention to provide an improved manual lever detent structure to limit the operator input movement and force at the detent mechanism of a transmission manual shift lever.

One aspect in accomplishing this object is to provide a lost motion assembly comprised of a trapped spring disposed in the manual shift lever between the operator button and the actuator rod.

The present invention is best depicted in the floor mounted manual shift lever on which a handle is provided for the operator to grip and a button is disposed within the handle to permit the operator to override the detent when shifting between ratios. The operator input force at the button is transmitted through an actuator rod within the shift handle to operate the detent. In systems utilizing interlocks, particularly an interlock operating on the detent pawl, a bell crank is provided which is held in place by electro-magnetic actuators or by a mechanical cable system disposed between the ignition interlock and the bell crank and between the brake pedal and the bell crank.

In order to limit the amount of input force that can be applied by the operator to the bell crank, a trapped spring is disposed within the actuator rod assembly to limit the amount of input force permitted by the operator. If the one or more of the interlocks is actuated, the operator input force will be absorbed through compression of the spring, thereby preventing unauthorized removal of the detent from the park position when the ignition interlock is actuated. In many instances, it is desirable to have an override on the interlocks to permit movement of the vehicle in case of an electrical malfunction when electrical interlocks are utilized.

The BTSI interlock force can be controlled through the use of an electro-magnetic actuator at a level which will permit the operator to override the control force in the event of a electrical malfunction within the control system.

DESCRIPTION OF THE DRAWINGS

FIG. 1 is a diagrammatic representation of a floor mounted shift lever for an automatic transmission having both BTSI and ignition interlocks.

FIG. 2 is a view taken along line 2—2 of FIG. 1.

DESCRIPTION OF AN EXEMPLARY EMBODIMENT

Referring to the drawings, wherein like characters represent the same or corresponding parts throughout the two views, there is seen a transmission shift assembly 10 including an operator handle 12, a tubular housing 14, a stationary base member 16 and a clevis 18 secured to the housing 14, and pivotally mounted on a shift lever pivot pin 20 disposed in the base 16.

The base 16 also has formed as a portion thereof a shift gate or detent gate 22 which has a plurality of detent slots including one for park "P", reverse "R", neutral "N", drive "D" and low "L". Detent gates and the use thereof in automatic transmissions is well known. The detent gate 22 has cooperating therewith an actuator pin or detent pin 24 which is urged into engagement in the respective detent slots by a return spring, not shown. A bell crank 25 is pivotally mounted on a pin 26 secured in the base 16. The bell crank 25 has a first arm 28 which engages the actuator pin 24 and a second arm 30 which is connected with an ignition interlock assembly 32 and a BTSI control interlock 34.

The ignition interlock 32 provides a cable or electrical connection 36 between a conventional ignition key 38 and an actuator 40 secured to the base 16. The BTSI 34 provides an electrical or mechanical connection 42 disposed between a conventional vehicle brake pedal and mechanism 44 and an actuator 46 also secured to the base 16. The actuators 46 and 40 are connected to the arm 30 of the bell crank 25. One or more of these actuators has a spring disposed therein which urges the bell crank 25 to the position shown in FIG. 1 where the actuator pin 24 is urged to the park detent slot on the shift gate 22 by the arm 28.

In the alternative, a conventional return spring, such as a torsion spring disposed between the base 16 and the pin 24 can be utilized. These structures are well known and those skilled in the art will readily determine that a number of return spring type devices have been utilized in past shift assemblies.

The actuator pin 24 is secured to a lower actuator rod 48 which has secured thereto a spring housing 50. A compression spring 52 is disposed in the spring housing 50 and is compressed against one end of the spring housing 50. The other end of spring 52 engages an upper actuator rod 54 which is urged against an upper lip or edge 56 of the spring housing 50. Thus, the spring 52 is trapped in compression between the upper actuator rod 54 and the lower actuator rod 48. The upper actuator rod 54 is operated on by a dog bone or lever 58 which is secured in the handle 12. Lever 58 has an end 60 abutting the upper actuator rod 54 and an end 62 which is pivotally disposed against the surface of the handle 12.

The end 60 is also disposed in abutment with a ramp or canted surface 64 of a button 66 which is slidably disposed within the handle 12. The button 66 is accessible to the operator, such that when it is desired to manipulate the shifter assembly 10 from park position to one of the other operating positions or back to the park position, the button 66 is depressed which will urge the upper actuator rod 54, the spring 52 and the lower actuator rod 48 downward, as seen in FIG. 1, thereby pivoting the bell crank 25 about the pivot pin 26 until the actuator pin 24 has moved sufficiently to be removed from the park slot "P". When this has been accomplished, the movement between the other drive positions is conducted in a conventional manner by pivoting about the pin 20.

As a general rule, the first drive position out of the park position will be reverse. The operator can move the shift lever from reverse to neutral without depressing the button 66. However, movement from neutral to either forward drive or reverse requires depression of the button 66, as does movement from drive, low or other ratios which might be included. This is a conventional detent structure for shift mechanisms.

When the vehicle is at rest and the ignition key 38 is manipulated to a lock position with the transmission in the park position as shown, the interlock 32 will inhibit the bell crank 25 from pivoting about the pin 26. Should someone without the ignition key attempt to depress the button in an effort to shift, the button 66 will move linearly within the handle 12, however, the spring 52 will compress within the housing 50 due to the reaction of the arm 28 on pin 24 and the lower actuator rod 48.

The force imposed by the ignition interlock 32 is sufficiently large such that the spring 52 can be compressed permitting the ramp surface 64 of the button 66 to be urged into abutment with a stop tab 68 formed on the housing 14. This limits the amount of force that can be input to the bell crank 25 and the system is designed so that this force is not sufficient to rotate the bell crank out of the interlock position prior to the ignition interlock being disconnected by movement of the ignition key from the lock position.

The BTSI interlock 34 is generally an electro-magnetic actuator which is energized when the ignition system is manipulated from the lock position to a run or start position. When the electro-magnetic actuator is energized, a predetermined force is imposed upon the bell crank 25. This force can be controlled by the length of the lever arm on the arm 30 as compared with the lever arm on the arm 28 where the actuator pin 24 is disposed in abutment. This force can be adjusted or controlled such that full depression of the button 66 against the stop 68 will apply sufficient force to permit the bell crank 25 to be pivoted sufficiently to permit removal of the actuator pin 24 from the park slot "P". A force of 25–30 pounds has been found to be acceptable.

However, the resistance of the spring 52 to the operator input force will remind the operator that the brake pedal should be depressed prior to this manipulation being undertaken. There are instances wherein the electrical system of the vehicle may be inoperable and it may be desirable to shift the transmission from the park position to a neutral position to permit towing of the vehicle. The present system permits this. Under this condition, the ignition key 38 is manipulated from the lock position with the key and the operator input button 66 is depressed and, as previously described, will have sufficient force to overcome the interlocks of the system.

In the event the BTSI interlock malfunctions in the energized condition, the operator can override the BTSI interlock by providing sufficient force to the button 66, as previously described. However, again, the operator will be reminded that the brake pedal must be depressed or, if the brake pedal has been depressed, there is a fault in the system which should be corrected.

We claim:

1. A transmission park actuator and control comprising in combination:

a manually operated shift lever having a manually controlled rod;

a transmission ratio position control assembly having a detent gate, an actuator pin and retaining means separate from and movable relative to said detent gate and said actuator pin for retaining the actuator pin in a predetermined slot in the detent gate when the shift lever has been manipulated to a predetermined position; and lost motion means disposed in the manually controlled rod effective to prevent transfer of a manual input motion to move the retaining means prior to actuation of an operator selected condition being performed.

2. The transmission park actuator and control defined in claim 1, wherein the manually controlled rod is comprised of first and second rod portions, one of which is directly movable by the operator and the other engages the actuator pin, and also wherein there lost motion means is comprised of a spring member trapped between the rod portions to permit relative motion therebetween.

3. The transmission park actuator and control defined in claim 1, wherein the manually controlled rod comprises an input member accessible to an operator.

4. The transmission park actuator and control defined in claim 1 wherein said retaining means comprises a pivotally mounted lever operatively connected with an operator controlled vehicle brake actuator.

* * * * *